(12) United States Patent
Mehravaran

(10) Patent No.: US 10,690,233 B2
(45) Date of Patent: Jun. 23, 2020

(54) BYPASS CONTROL FOR U-FLOW TRANSMISSION OIL COOLERS

(71) Applicant: FORD GLOBAL TECHNOLOGIES, LLC, Dearborn, MI (US)

(72) Inventor: Meisam Mehravaran, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 94 days.

(21) Appl. No.: 15/221,029

(22) Filed: Jul. 27, 2016

(65) Prior Publication Data

US 2018/0031111 A1   Feb. 1, 2018

(51) Int. Cl.
| | | |
|---|---|---|
| F16H 57/04 | (2010.01) | |
| F16K 31/00 | (2006.01) | |
| F28D 15/00 | (2006.01) | |
| F28F 27/02 | (2006.01) | |
| F28D 21/00 | (2006.01) | |

(52) U.S. Cl.
CPC ..... *F16H 57/0417* (2013.01); *F16H 57/0413* (2013.01); *F16H 57/0435* (2013.01); *F16K 31/002* (2013.01); *F28D 15/00* (2013.01); *F28F 27/02* (2013.01); *F28D 2021/0089* (2013.01); *F28F 2250/06* (2013.01); *F28F 2250/08* (2013.01); *F28F 2250/102* (2013.01)

(58) Field of Classification Search
CPC ............. F16H 57/0417; F16H 57/0435; F16H 57/0413; F16K 31/002; F28D 15/00; F28D 2021/0089; F28F 27/02; F28F 2250/08; F28F 2250/102; F28F 2021/0089; F28F 2250/06

USPC ......................................... 165/287, 294–297
See application file for complete search history.

(56) References Cited

U.S. PATENT DOCUMENTS 1,888,225 A * 11/1932 Hetherington ......... G05D 23/10
236/93 R
2,164,605 A *  7/1939 Young ................... F28D 1/0535
165/297
2,212,285 A *  8/1940 Ayers ....................... F24C 3/12
236/92 A (Continued)

FOREIGN PATENT DOCUMENTS

CA         2454074 A1    6/2004
CN       103438749 B    12/2013

(Continued)

OTHER PUBLICATIONS

Final Office Action dated May 2, 2019 issued to U.S. Appl. No. 15/371,374, filed Dec. 7, 2016, 45 pgs.

*Primary Examiner* — Ljiljana V. Ciric
(74) *Attorney, Agent, or Firm* — Vincent Mastrogiacomo; Brooks Kushman P.C.

(57) ABSTRACT

A system for bypass control within a transmission oil cooler of U-flow design in a motor vehicle includes a thermostat configured to selectively bypass transmission fluid directly from an inlet tank to an outlet tank of the transmission oil cooler in response to a temperature difference within the tanks relative a predefined threshold. The thermostat includes a thermal-sensitive element, such as a bimetal strip, that has one end bendable at a predetermined rate in a predetermined direction in response to a temperature difference between the inlet and outlet tanks of the transmission oil cooler.

14 Claims, 5 Drawing Sheets

(56) References Cited

U.S. PATENT DOCUMENTS

| | | | | |
|---|---|---|---|---|
| 3,190,555 A | * | 6/1965 | Wilson | G05D 23/027 236/48 R |
| 3,300,135 A | * | 1/1967 | Slater | F16H 57/0413 236/34.5 |
| 3,404,837 A | * | 10/1968 | James | G05D 23/134 236/34.5 |
| 3,445,317 A | * | 5/1969 | Marshall | F24F 11/74 165/279 |
| 3,554,440 A | * | 1/1971 | Austin | F16H 57/0413 236/34.5 |
| 3,754,706 A | * | 8/1973 | Tao | F16H 57/0413 236/92 R |
| 3,877,513 A | * | 4/1975 | Arledge, Jr. | F24F 1/01 165/247 |
| 3,990,504 A | * | 11/1976 | Kolthoff, Jr. | F28D 1/05341 165/271 |
| 4,032,068 A | | 6/1977 | Luchtenberg et al. | |
| 4,086,956 A | * | 5/1978 | Block | E04H 4/129 165/297 |
| 4,337,737 A | * | 7/1982 | Pechner | F28F 27/02 123/196 AB |
| 4,423,751 A | * | 1/1984 | Roettgen | B01D 35/143 137/557 |
| 4,593,749 A | * | 6/1986 | Schatz | B60H 1/02 165/101 |
| 4,669,532 A | * | 6/1987 | Tejima | F01M 5/007 165/103 |
| 4,828,169 A | * | 5/1989 | Smith | F24D 19/081 138/46 |
| 4,846,219 A | * | 7/1989 | Schaefer | G05D 23/134 137/557 |
| 4,993,367 A | * | 2/1991 | Kehrer | F28D 7/163 122/7 R |
| 5,152,144 A | * | 10/1992 | Andrie | F02B 29/0418 123/549 |
| 5,174,373 A | * | 12/1992 | Shinmura | F28D 1/05391 165/102 |
| 5,242,011 A | * | 9/1993 | Hesse | F01P 11/18 137/539 |
| 5,305,826 A | * | 4/1994 | Couetoux | F01P 7/16 123/41.08 |
| 5,353,757 A | * | 10/1994 | Susa | F01P 3/20 123/41.29 |
| 5,575,329 A | * | 11/1996 | So | F28F 9/0217 165/167 |
| 5,904,292 A | * | 5/1999 | McIntosh | G05D 23/1393 165/295 |
| 6,012,550 A | * | 1/2000 | Lee | F16H 57/0412 184/6.22 |
| 6,182,749 B1 | * | 2/2001 | Brost | F01M 5/007 123/196 AB |
| 6,935,569 B2 | * | 8/2005 | Brown | F01M 5/007 236/34.5 |
| 7,306,030 B2 | * | 12/2007 | Luvisotto | F16K 15/16 137/454.2 |
| 7,353,865 B2 | * | 4/2008 | Speer | B60H 1/18 165/281 |
| 7,487,826 B2 | | 2/2009 | Pineo et al. | |
| 7,527,087 B2 | * | 5/2009 | Desai | F28D 1/0443 165/140 |
| 7,832,467 B2 | * | 11/2010 | Moser | F01M 5/002 165/103 |
| 8,020,782 B2 | * | 9/2011 | Moser | G01K 5/62 123/41.08 |
| 8,123,143 B2 | * | 2/2012 | Willers | G05D 23/1333 236/101 A |
| 8,132,616 B1 | * | 3/2012 | Brower | H05K 7/20272 165/101 |
| 8,210,244 B2 | * | 7/2012 | Kuniavskyi | F01P 11/0204 165/101 |
| 8,225,849 B2 | * | 7/2012 | Hendrix | F02B 29/0418 123/568.12 |
| 8,544,454 B2 | | 10/2013 | Geskes et al. | |
| 8,726,889 B2 | * | 5/2014 | Cockerill | F02B 29/0418 123/540 |
| 8,839,748 B2 | * | 9/2014 | Kim | F01P 7/16 123/41.33 |
| 8,869,779 B2 | * | 10/2014 | Yoon | F02B 29/0418 123/41.33 |
| 8,960,269 B2 | * | 2/2015 | Cheadle | F01M 5/00 165/101 |
| 9,377,789 B2 | * | 6/2016 | Lee | G05D 23/1333 |
| 9,664,087 B2 | | 5/2017 | Sloss | |
| 9,772,632 B1 | * | 9/2017 | Ihns | G05D 23/1333 |
| 9,958,219 B2 | * | 5/2018 | Gosioco | F28F 9/22 |
| 9,989,322 B2 | * | 6/2018 | Cheadle | F28F 27/02 |
| 2003/0111211 A1 | | 6/2003 | Stonehouse et al. | |
| 2004/0050543 A1 | * | 3/2004 | Kim | F01P 3/18 165/202 |
| 2005/0039729 A1 | | 2/2005 | Rosin et al. | |
| 2006/0237079 A1 | * | 10/2006 | Cheadle | F16K 15/16 137/855 |
| 2008/0023190 A1 | * | 1/2008 | Peric | F16K 15/144 165/283 |
| 2008/0184974 A1 | | 8/2008 | Kobayashi et al. | |
| 2009/0090495 A1 | * | 4/2009 | Domes | F28D 7/0075 165/165 |
| 2009/0166022 A1 | * | 7/2009 | Desai | F28D 1/0443 165/279 |
| 2009/0260786 A1 | * | 10/2009 | Palanchon | F28D 9/0031 165/176 |
| 2010/0126478 A1 | | 5/2010 | Okawa et al. | |
| 2010/0243220 A1 | * | 9/2010 | Geskes | F02B 29/0418 165/133 |
| 2010/0243320 A1 | | 9/2010 | Geskes et al. | |
| 2011/0067853 A1 | * | 3/2011 | Moser | F01M 5/002 165/297 |
| 2011/0099989 A1 | * | 5/2011 | Prior | F01N 3/043 60/320 |
| 2011/0220072 A1 | * | 9/2011 | Seybold | F01N 5/02 123/543 |
| 2012/0017575 A1 | * | 1/2012 | Sloss | F01N 5/02 60/320 |
| 2013/0160972 A1 | * | 6/2013 | Sheppard | F16K 11/0716 165/96 |
| 2014/0047833 A1 | | 2/2014 | Buckland et al. | |
| 2014/0048048 A1 | | 2/2014 | Glugla et al. | |
| 2014/0100074 A1 | | 4/2014 | Glugla | |
| 2014/0100758 A1 | | 4/2014 | Glugla et al. | |
| 2014/0109846 A1 | | 4/2014 | Styles et al. | |
| 2014/0120820 A1 | | 5/2014 | Glugla et al. | |
| 2014/0150755 A1 | | 6/2014 | Cunningham et al. | |
| 2014/0251239 A1 | | 9/2014 | Richards et al. | |
| 2014/0251579 A1 | * | 9/2014 | Sloss | F01N 5/02 165/96 |
| 2014/0352812 A1 | * | 12/2014 | Dulin | F16K 31/002 137/468 |
| 2015/0047339 A1 | | 2/2015 | Rollinger et al. | |
| 2015/0047341 A1 | | 2/2015 | Ulrey et al. | |
| 2015/0135705 A1 | | 5/2015 | Pursifull | |
| 2015/0247678 A1 | * | 9/2015 | Tylutki | F28D 1/05325 165/103 |
| 2015/0285129 A1 | | 10/2015 | Dziubinschi et al. | |
| 2015/0369179 A1 | | 12/2015 | Hotta | |
| 2018/0031111 A1 | | 2/2018 | Mehravaran | |
| 2018/0100471 A1 | | 4/2018 | Minami et al. | |

FOREIGN PATENT DOCUMENTS

| | | |
|---|---|---|
| DE | 102007040661 A1 | 3/2009 |
| DE | 102015201621 A1 | 8/2016 |
| EP | 2048345 A2 | 4/2009 |
| EP | 2088307 A2 | 8/2009 |
| FR | 2959455 A1 | 11/2011 |
| GB | 2531063 A | 4/2016 |
| KR | 100409563 B1 | 12/2003 |

(56) References Cited

FOREIGN PATENT DOCUMENTS

| | | |
|---|---|---|
| WO | 2007104580 A2 | 9/2007 |
| WO | 2008058734 A1 | 5/2008 |

* cited by examiner

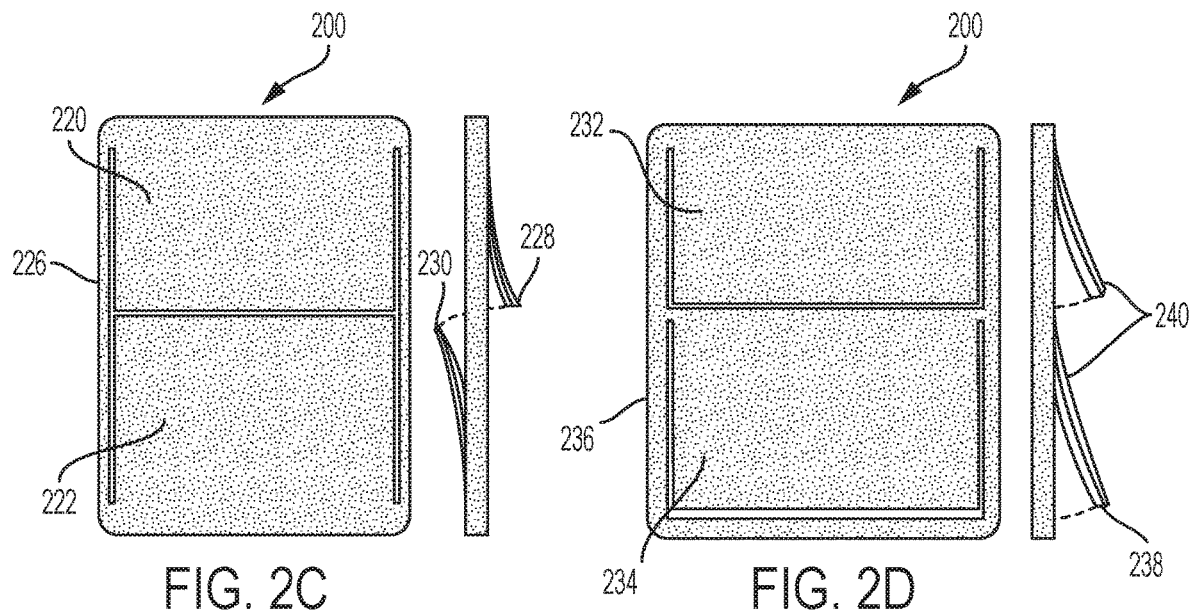
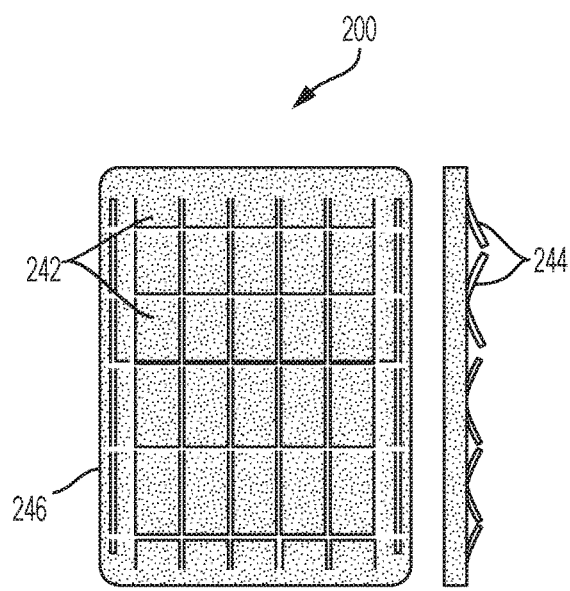

BYPASS CONTROL FOR U-FLOW TRANSMISSION OIL COOLERS

TECHNICAL FIELD

The present disclosure relates to bypass control for a transmission oil cooler of U-flow design in a motor vehicle.

BACKGROUND

In a motor vehicle, it is necessary to cool the oil used in automatic transmissions. The temperature of automotive transmission fluid (or ATF) may reach elevated temperatures during sustained vehicle operation. However, at these elevated temperatures, transmission fluid is known to experience effects such as oxidization, which impacts the lubricative properties of the transmission fluid. In order to avoid a breakdown of the transmission fluid, these high temperatures need to be reduced. To reduce these high temperatures, an automatic transmission may be provided with a heat exchanger in fluid communication with the transmission. The heat exchanger may be referred to as a transmission cooler and may be an oil/air cooler.

One type of heat exchanger is known as a U-flow transmission cooler. In this type of system, transmission fluid is supplied from an inlet tank at a first side of the transmission cooler and is then discharged from an outlet tank at the same side of the cooler in the opposite direction. A U-flow transmission cooler has many advantages, such as simple design and manufacture, which is favorable for packaging. However, one problem with U-flow transmission coolers is that high thermal stresses may result in the inlet and outlet tanks during operation. This problem may occur because the inlet and outlet tanks are where the highest and lowest temperature gradients occur. As such, there is a need for a system that minimizes and/or reduces high temperature gradients and thermal stresses within U-flow transmission coolers.

SUMMARY

According to embodiments of the present disclosure, a system for bypass control within a transmission oil cooler of U-flow design in a motor vehicle is disclosed. In particular, the system provides for a thermostat configured to bypass fluid directly from the inlet tank to the outlet tank of the transmission cooler in cases of large temperature gradients.

In one embodiment, a transmission cooler includes an inlet tank adjacent an outlet tank and separated by a baffle defining a bypass channel for fluid flow therethrough. A thermostat is disposed within the bypass channel and configured to bypass fluid through the bypass channel in response to a temperature difference between the inlet tank and the outlet tank exceeding a predefined threshold. The thermostat may further be configured to inhibit fluid flow through the bypass channel in response to the temperature difference between the inlet tank and the outlet tank being below the predefined threshold. The thermostat may include a bimetal element having a first end secured to a frame and a second end bendable at a predetermined rate in one direction in response to a temperature difference between the tanks to open and close the bypass channel.

In another embodiment, a transmission oil cooler is provided that includes a first flow path and a second flow path being parallel and adjacent to one another within a housing, wherein the first and the second flow paths include a plurality of flow ducts for cooling fluid. The cooler includes a deflecting region arranged on a rear side of the housing and adapted to receive fluid from the first flow path and direct fluid through the second flow path for cooling. An inlet tank and an outlet tank are arranged at a front of the housing, wherein the inlet tank is adapted to supply fluid to the first flow path and the outlet tank is adapted to discharge fluid cooled from the second flow path. The inlet tank and the outlet tank are adjacent and separated by a baffle defining a bypass channel for bypassing fluid directly from the inlet tank to the outlet tank. A thermostat is disposed within the bypass channel and configured to selectively bypass fluid through the bypass channel in response to a temperature difference between the inlet tank and the outlet tank relative to a predefined threshold. Additionally, the thermostat includes a thermal-sensitive element being bendable at a predetermined rate in a predetermined direction in response to the temperature difference between the tanks to open and close the bypass channel.

In yet another embodiment, a transmission system is disclosed that includes a heat exchanger having a fluid loop with an inlet tank adjacent to and separated from an outlet tank by a baffle defining a bypass channel for bypassing fluid directly between the tanks. The transmission system also includes a bypass valve configured to increase fluid flow rate from a transmission to the heat exchanger in response to heat rejection being below a threshold. The bypass valve may be further configured to decrease fluid flow rate from the transmission to the heat exchanger in response to heat rejection within the heat exchanger being above the threshold. The bypass valve may be also be configured to inhibit flow to the heat exchanger in response to a transmission fluid temperature being below a low temperature threshold. The heat exchanger may further include a thermostat disposed within the bypass channel and configured to bypass fluid directly between the tanks in response to a temperature difference therebetween exceeding a corresponding temperature threshold.

Various embodiments may provide one or more advantages. For example, bypass control within U-flow transmission oil coolers according to various embodiments minimizes and/or reduces high temperature gradients and thermal stresses within the inlet and outlet tanks. One or more embodiments provide for low cost and reliable transmission coolers with efficient heat transfer characteristics. The above advantages and other advantages and features of various embodiments of the claimed subject matter may be recognized by those of ordinary skill in the art based on the representative embodiments described and illustrated.

BRIEF DESCRIPTION OF THE DRAWINGS

FIG. 2C is a perspective view of a thermostat having two bimetal elements bendable in opposite directions according to one or more embodiments of the present disclosure;

FIG. 2D is a perspective view of a thermostat having two bimetal elements arranged in parallel according to one or more embodiments of the present disclosure;

FIG. 2E is a perspective view of a thermostat having a plurality of bimetal elements arranged in rows according to one or more embodiments of the present disclosure;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
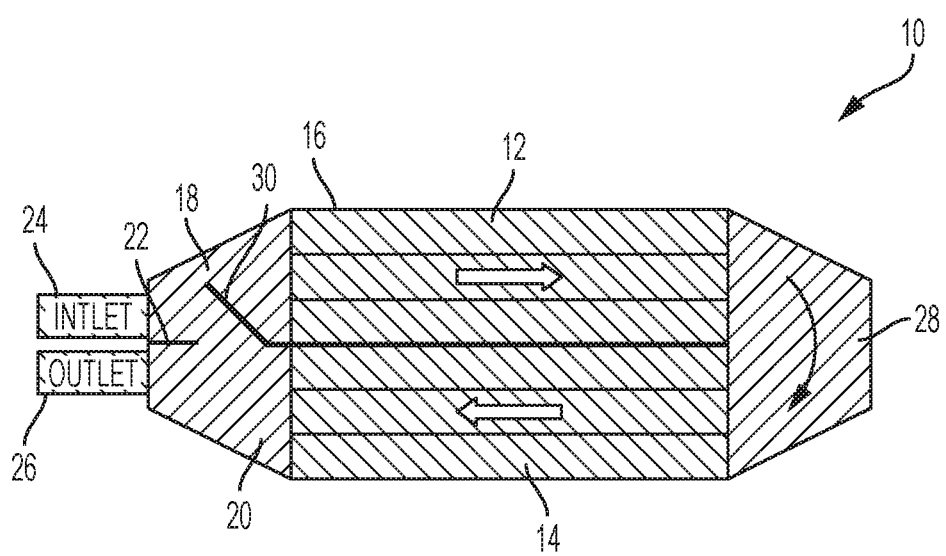
FIG. 1 is an illustration of a transmission oil cooler with an internal bypass according to one or more embodiments of the present disclosure.

FIG. 1 illustrates a heat exchanger 10, which may be referred to as a transmission oil cooler, of U-flow design for cooling transmission fluid of a motor vehicle according to embodiments of the present disclosure. In a U-flow transmission oil cooler, transmission fluid is supplied at a first side of the transmission oil cooler and is then discharged at the same side in the opposite direction. As shown in FIG. 1, a first flow path 12 and a second flow path 14 run parallel and adjacent to one another within a housing 16. The flow paths 12, 14 include a plurality of flow ducts for cooling the transmission fluid, which are formed in the present case as flat tubes of rectangular cross section. However, the cross section may also have some other shape, for example the cross section could be circular.

An inlet tank 18 and an outlet 20 tank are arranged at a front of housing 16. The inlet tank 18 and outlet tank 20 are adjacent to one another and separated by a baffle 22. Inlet tank 18 supplies transmission fluid of a motor vehicle from an inlet 24 to the first flow path 12, where the transmission fluid is initially subjected to a first cooling. After flowing through the first flow path 12, the transmission fluid passes into a deflecting region 28, which is arranged on a rear side of the housing 16. Fluid flow into the deflecting region 28 is merged and redirected through the second flow path 14, where the fluid is further cooled. When the fluid leaves the second flow path 14, it passes into the outlet tank 20. The outlet tank 20 is configured to discharge cooled transmission fluid from the second flow path 14 through outlet 26.

Baffle 22 may include an opening or a bypass channel so that the inlet tank 18 is in direct fluid communication with the outlet tank 20. A thermostat 30 may be disposed within the bypass channel and coupled thereto for selectively bypassing fluid directly from the inlet tank 18 to the outlet tank 20 under certain operating conditions where a temperature difference between the inlet tank 18 and the outlet tank 20 exceeds a predefined threshold. For example, the thermostat 30 will open during low flow conditions where the transmission oil cooler 10 is not doing much work resulting in large temperature differences between inlet and outlet tanks 18, 20. Thermostat 30 may also open when the heat rejection from the transmission oil cooler 10 is too large or exceeds a corresponding threshold and the temperature in the outlet tank 20 is much lower than that of the inlet tank 18. Opening thermostat 30 and bypassing fluid therethrough in response to large temperature gradients decreases the temperature difference between inlet tank 18 and outlet tank 20 and prevents over cooling of the transmission fluid, which improves fuel economy.

When the temperature difference between inlet tank 18 and outlet tank 20 is below the predefined threshold, thermostat 30 is configured to close and inhibit fluid flow through the bypass channel of baffle 22. Thermostat 30 includes a thermal-sensitive element such as a bimetal strip having a first metal on one side of the bimetal strip and a second metal on the opposite of the bimetal strip. The two metals expand at different rates in response to a temperature difference between inlet tank 18 and outlet tank 20. The bimetal strip may be bendable at a predetermined rate in a predetermined direction in response to a temperature difference between the inlet and outlet tanks 18, 20 of the transmission cooler 10 to open and close the bypass channel in baffle 22.

Figure 2A:
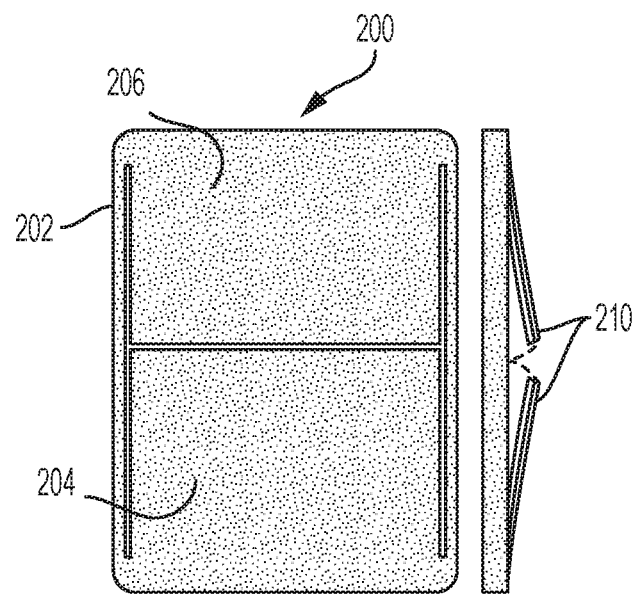
FIG. 2A is a perspective view of a thermostat having two bimetal elements opposing one another according to one or more embodiments of the present disclosure.

With reference to FIGS. 2A-2G, thermostat 200 may be of various configurations to allow for efficient heat rejection and bypass control within transmission oil cooler 10. As shown in FIG. 2A, thermostat 200 may include a first bimetal element 204 opposing a second bimetal element 206 and each having a first end secured to a frame 202 and a second end 210 bendable at a predetermined rate in response to a temperature difference between the inlet and outlet tanks of the transmission oil cooler to open and close the baffle's bypass channel. The frame 202 is then mounted within, and coupled thereto, the baffle's bypass channel.

Figure 2B:
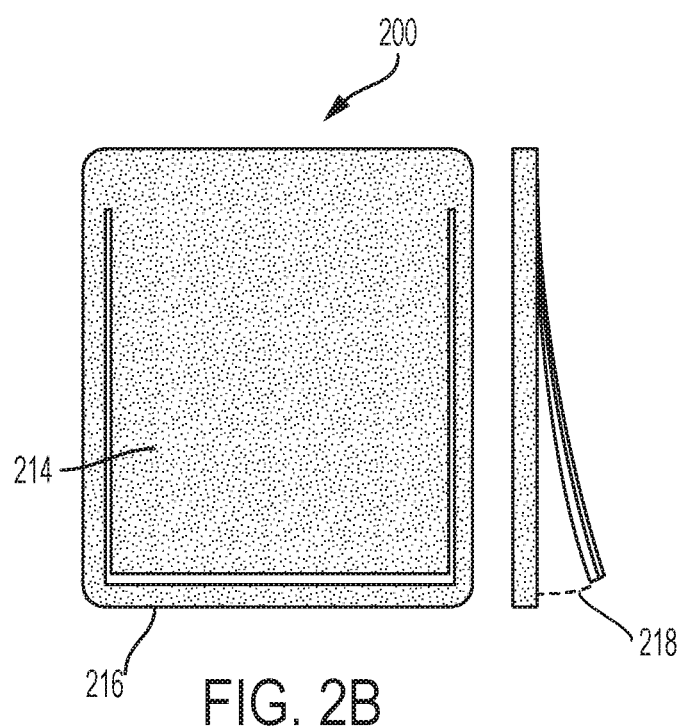
FIG. 2B is a perspective view of a thermostat having one bimetal element according to one or more embodiments of the present disclosure.

As shown in FIG. 2B, thermostat 200 may also have a singular bimetal element 214 having a first end secured to a frame 216 for mounting within the baffle's bypass channel and a second end 218 bendable at a predetermined rate in one direction in response to a temperature difference between the inlet and outlet tanks of the transmission oil cooler to open and close the baffle's bypass channel.

As shown in FIG. 2C, thermostat 200 may include a first bimetal element 220 opposing a second bimetal element 222 and each having a first end secured to a frame 226 and a second end bendable at a predetermined rate in response to a temperature difference between the tanks to open and close the bypass channel. The second end 228 of the first bimetal element 220 is bendable in a first direction and the second end 230 of the second bimetal element 222 is bendable in a second direction opposite the first direction of movement of the first bimetal element 220.

As shown in FIG. 2D, thermostat 200 may include a first bimetal element 232 arranged above and in parallel with a second bimetal element 234, wherein the first and second bimetal elements 232, 234 each have one end secured to a frame 236. The frame 236 is for mounting and securing the thermostat 200 to the baffle of the transmission oil cooler. The first bimetal element 232 includes an end 240 bendable at a predetermined rate in a predetermined direction in response to a temperature difference between the inlet and outlet tanks of the transmission cooler. Similarly, the second bimetal element 234 includes an end 238 bendable at a predetermined rate in a predetermined direction in response to a temperature difference between the cooler tanks. The first and second bimetal elements 232, 234 open and close the baffle's bypass channel.

Figure 2F:
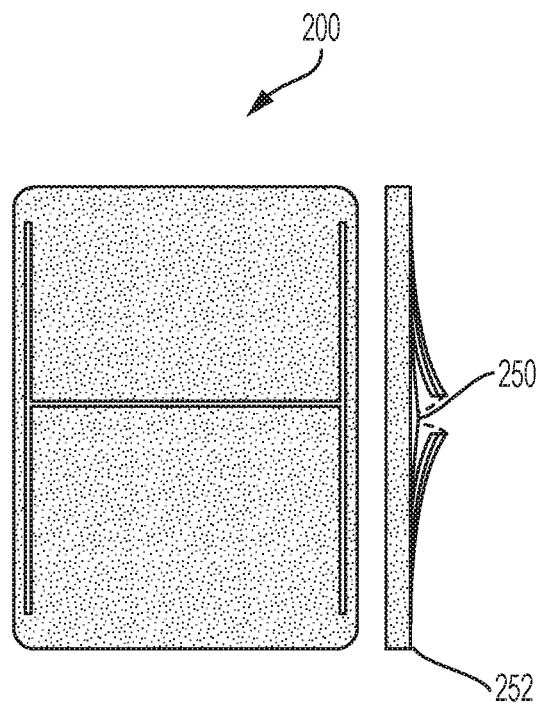
FIG. 2F is a perspective view of a thermostat having multiple bimetal elements and a protrusion extending therefrom according to one or more embodiments of the present disclosure.
Figure 2G:
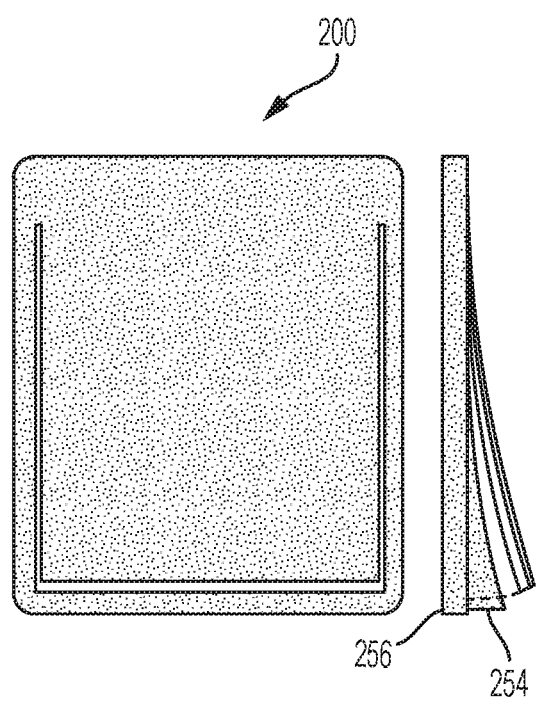
FIG. 2G is a perspective view of a thermostat having a single bimetal element and a protrusion extending therefrom according to one or more embodiments of the present disclosure.

As shown in FIG. 2E, thermostat 200 may include a plurality of bimetal elements 242 arranged in rows, wherein the plurality of bimetal elements 242 each have a first end secured to a frame 246 for coupling thermostat 200 to the baffle of the transmission oil cooler. The plurality of bimetal elements 242 also have a second end 244 bendable at a predetermined rate in one direction in response to the temperature difference between the tanks to open and close the baffle's bypass channel. As shown in FIGS. 2F and 2G, thermostat 200 may include protrusions 250, 254 that extend outwardly from the frame 252, 256 towards the bimetal element in such a manner as to reduce leakage of fluid between the tanks.

Figure 3:
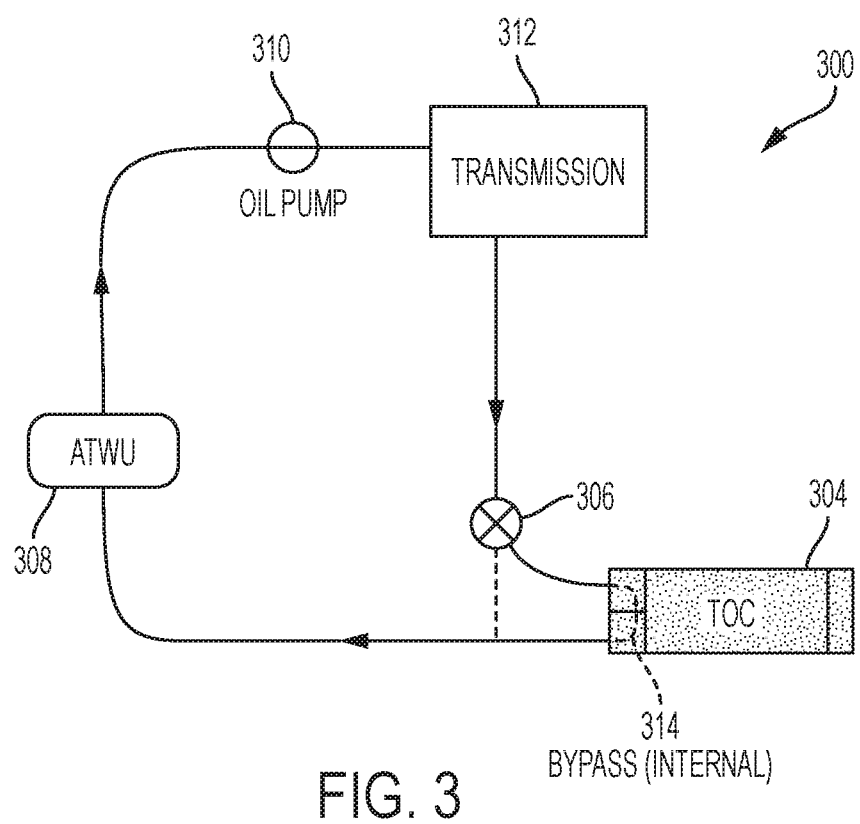
FIG. 3 is a schematic illustration of a transmission coolant loop according to one or more embodiments of the present disclosure.

Referring to FIG. 3, a transmission coolant loop 300 is schematically illustrated in accordance with embodiments of the present disclosure. Transmission coolant loop 300 includes transmission 312, transmission oil cooler 304 with internal bypass 314, heat exchanger 308 and transmission oil pump 310. The transmission coolant loop may also include an external bypass 306. Heat exchanger 308 may be an active transmission warmup heat exchanger that uses waste heat from a vehicle to quickly warm the transmission fluid to an operating temperature range. Transmission oil pump 310 circulates fluid through transmission coolant loop 300.

External bypass 306 may selectively route fluid to transmission oil cooler 304 in response to a temperature of the fluid exceeding a corresponding threshold indicating the fluid needs to be cooled. In cases of low temperature fluid flow and when fluid temperature is below the corresponding threshold, the external bypass 306 bypasses fluid from flowing through transmission oil cooler 304. In cases when transmission fluid is directed to transmission oil cooler 304, fluid may further be routed through an internal bypass 314 within transmission oil cooler 304, as discussed above in reference to FIG. 1. Additionally, if the heat rejection is not enough due to bypassing fluid through internal bypass 314, external bypass 306 may be configured to open more to increase a fluid flow rate to the transmission oil cooler 304. This will lead to higher heat rejection but at lower temperature difference between inlet and outlet tanks of transmission oil cooler 304.

As can be seen by the representative embodiments described herein, embodiments according to the present disclosure provide robust and efficient bypass control for U-flow transmission oil coolers that minimize and/or reduce high temperature gradients and thermal stresses. One or more embodiments provide U-flow transmission coolers with higher durability due to lower thermal stresses. Additionally, this approach may be used in other types of U-flow heat exchangers, such as radiators, charge air coolers, condensers, etc.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A transmission cooler, comprising:
   an inlet tank adjacent an outlet tank, the inlet tank being fluidly separated from the outlet tank by a baffle, the baffle defining a bypass channel for fluid to flow from the inlet tank to the outlet tank; and
   a thermostat disposed within the bypass channel and configured to inhibit fluid through the bypass channel in response to the temperature difference between the inlet tank and outlet tank being below a predefined threshold, and allow bypass fluid through the bypass channel in response to a temperature difference between the inlet tank and the outlet tank exceeding the predefined threshold.

2. The transmission cooler of claim 1, wherein the thermostat includes a frame and a bimetal element having a first end secured to the frame and a second end bendable at a predetermined rate in one direction in response to a temperature difference between the inlet tank and the outlet tank to open and close the bypass channel.

3. The transmission cooler of claim 2, wherein a protrusion extends outwardly from the frame towards the second end of the bimetal element in such a manner as to reduce leakage of fluid between the inlet tank and the outlet tank.

4. The transmission cooler of claim 2, wherein the bimetal element is a bimetal strip having a first metal on a first side of the bimetal strip and a second metal on a second side of the bimetal strip, wherein the first metal and the second metal have different rates of thermal expansion.

5. The transmission cooler of claim 1, wherein the thermostat includes a frame, and a first bimetal element opposing a second bimetal element and each of the first and second bimetal elements having a first end secured to the frame and a second end bendable at a predetermined rate in response to a temperature difference between the inlet tank and the outlet tank to open and close the bypass channel.

6. The transmission cooler of claim 5, wherein the second end of the first bimetal element is bendable in a first direction and the second end of the second bimetal element is bendable in a second direction opposite movement in the first direction of the first bimetal element.

7. The transmission cooler of claim 1, wherein the thermostat includes a plurality of bimetal elements arranged in a row, wherein the plurality of bimetal elements each have a first end secured to a frame and a second end bendable at a predetermined rate in one direction in response to the temperature difference between the tanks to open and close the bypass channel.

8. A transmission oil cooler, comprising:
a housing defining a first flow path and a second flow path being parallel and adjacent to one another, wherein the first and the second flow paths include a plurality of flow ducts for directing fluid along the first and second flow paths, and wherein the first flow path begins at a front side of the housing and ends at a rear side of the housing, and the second flow path begins at the rear side and ends at the front side;
a deflecting region on the rear side and fluidly connected between the first and second flow paths, wherein the deflecting region receives fluid from the first flow path and directs fluid into the second flow path for cooling;
an inlet tank and an outlet tank arranged on the front side of the housing, and fluidly connected to the first and second flow paths, respectively, the inlet tank being adapted to supply fluid to the first flow path and the outlet tank being adapted to discharge fluid cooled from the second flow path, wherein the inlet tank and the outlet tank are adjacent and fluidly separated by a baffle, the baffle defining a bypass channel for bypassing fluid directly from the inlet tank to the outlet tank; and
a thermostat disposed within the bypass channel and configured to selectively bypass fluid through the bypass channel in response to a temperature difference between the inlet tank and the outlet tank relative to a predefined threshold.

9. The transmission oil cooler of claim 8, wherein the thermostat is further configured to bypass fluid through the bypass channel in response to the temperature difference between the inlet tank and the outlet tank exceeding the predefined threshold.

10. The transmission oil cooler of claim 8, wherein the thermostat is further configured to inhibit fluid flow through the bypass channel in response to the temperature difference between the inlet tank and the outlet tank being below the predefined threshold.

11. The transmission oil cooler of claim 8, wherein the thermostat includes a thermal-sensitive element being bendable at a predetermined rate in a predetermined direction in response to the temperature difference between the inlet tank and the outlet tank to open and close the bypass channel.

12. The transmission oil cooler of claim 11, wherein the thermal-sensitive element is a bimetal strip having a first metal and a second metal that expand at different rates.

13. The transmission oil cooler of claim 11, wherein the thermal-sensitive element includes a frame, a first bimetal strip and second bimetal strip, each of the first and second bimetal strips having a first end secured to the frame and a second end bendable at a predetermined rate in one direction in response to the temperature difference between the inlet tank and the outlet tank to open and close the bypass channel.

14. The transmission oil cooler of claim 13, wherein a protrusion extends outwardly from the frame towards the second end of the bimetal strips in such a manner as to reduce leakage of fluid between the inlet tank and the outlet tank.

* * * * *